Figure 1:
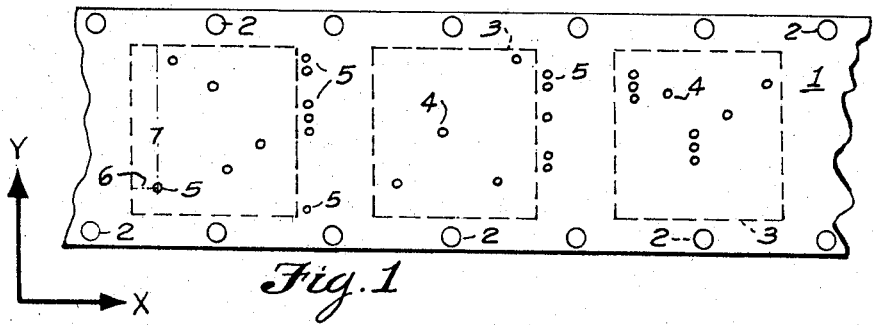

Nov. 21, 1967  F. JONKER  3,353,441
SUPERIMPOSABLE CARD SYSTEM BASED ON NOVEL RECORDS
Filed Oct. 15, 1963  3 Sheets-Sheet 1

INVENTOR
F. JONKER
BY Homer R. Montague
ATTORNEY

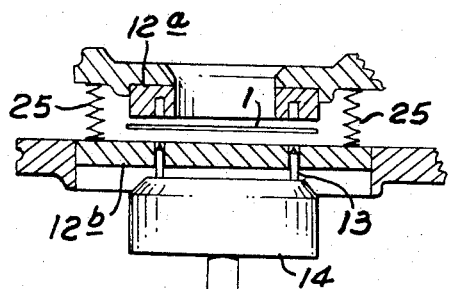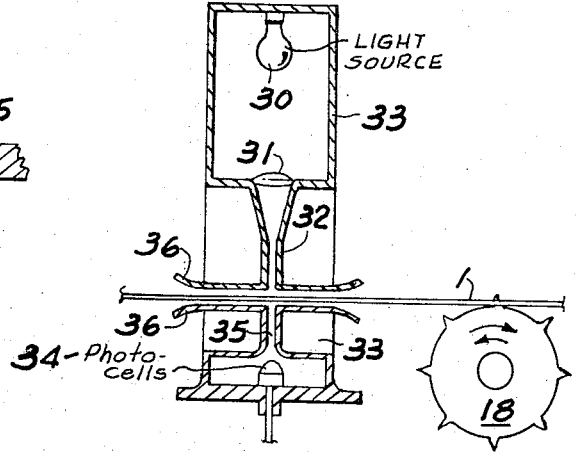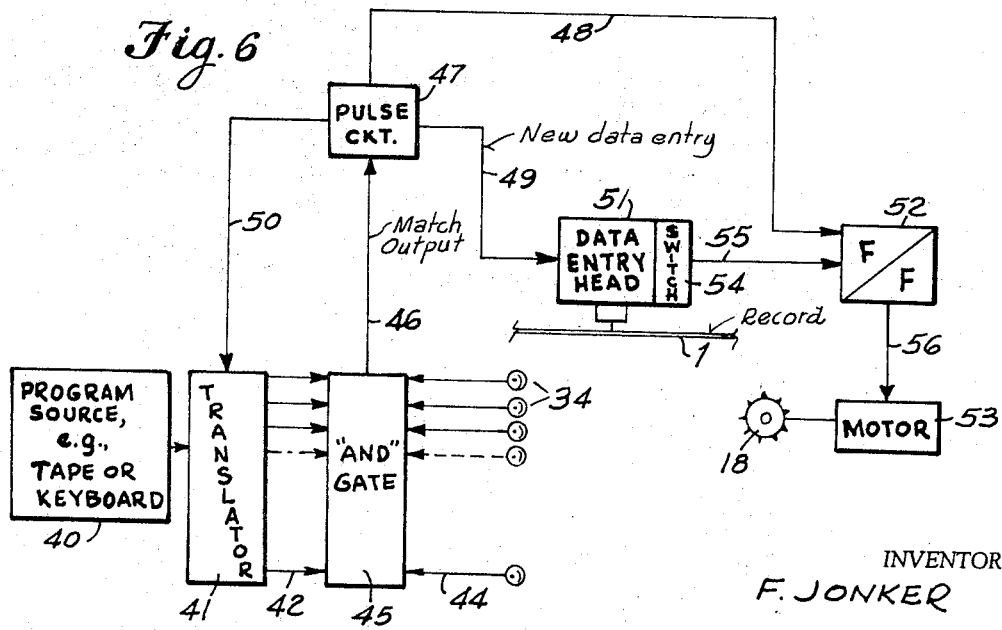

Nov. 21, 1967   F. JONKER   3,353,441
SUPERIMPOSABLE CARD SYSTEM BASED ON NOVEL RECORDS
Filed Oct. 15, 1963   3 Sheets-Sheet 3

INVENTOR
F. JONKER
BY Homer R. Montague
ATTORNEY

United States Patent Office 3,353,441
Patented Nov. 21, 1967

3,353,441
SUPERIMPOSABLE CARD SYSTEM BASED ON NOVEL RECORDS
Frederick Jonker, Washington, D.C., assignor to Jonker Business Machines, Inc., a corporation of Delaware
Filed Oct. 15, 1963, Ser. No. 316,422
5 Claims. (Cl. 88—24)

The present invention pertains to an information retrieval system of the kind base on the use of superimposible cards.

In systems of this kind, there is a card for every term or characteristic required to describe all of the information items of a certain information collection. Usually a "vocabulary" of 500 to 5000 terms is required. Thus there will be a corresponding number of term cards.

Each item of information in the collection is generally identical by a serial number.

If the information collection comprises, for example, 10,000 items, there will be 10,000 discrete positions on each term card, each of which is dedicated to one of the 10,000 items of information in the collection. These positions are generally arranged in an X–Y coordinate system.

In systems of this nature, the X coordinate of a position usually corresponds to the last two digits of the serial number of the corresponding item. The Y coordinate of this same position then corresponds to the first two digits of the serial number of this same item.

An item of information is entered into this system by taking all of the term cards corresponding to the terms by which the item has been indexed, and perforating each of said cards at the position corresponding to the serial number of that item of information.

The system is searched by a combination of terms, by taking the cards corresponding to said terms and placing them in superimposition. Coinciding holes in these cards then designate the search results.

Systems of this nature are well known in the art. They are sometimes referred to as superimposable card systems. They are commercially known as Termatrex systems. An apparatus to perform said functions is described in U.S. Patent No. 3,052,150.

It is also possible to identify an item of information by a combination of holes, placed in the cards instead of one hole. It is also possible to identify a characteristic by a combination of cards instead of one card. The invention also applies to systems of this nature but will be described for the case when an item is identified by only one hole, dedicated on the basis of an X–Y coordinate system and when a term is identified by one card only.

U.S. Patent No. 3,052,150 utilizes separate cards for each term. As a result, the data entry requires a great deal of manual removal of these cards out of the files, for drilling, and replacement of the same in the files. The data entry is, therefore, slow and costly.

The purpose of the present invention is to eliminate this card handling. According to the invention, this is achieved by the use of one or only a few continuous records. If one record is used, this record will be divided in sections, each corresponding to a term, and the required term area can be rapidly brought into engagement with the data entry device.

According to the invention, the records can be in the form of tapes, wound on reels or moved in or out of festoon baskets. The records can also be in sheet form or in the form of scrolls. The data can be entered either in the form of punching or drilling holes or by exposing spots on photographic film, which will then have to be developed.

A preferred medium is 35 mm. movie film with sprocket holes for alignment purpose either with a photographic emulsion for exposure by light or with an opaque coating for data entry by drilling.

Figure 2:
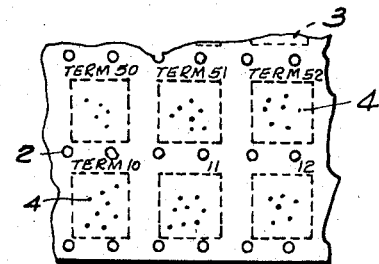
Figure 3:
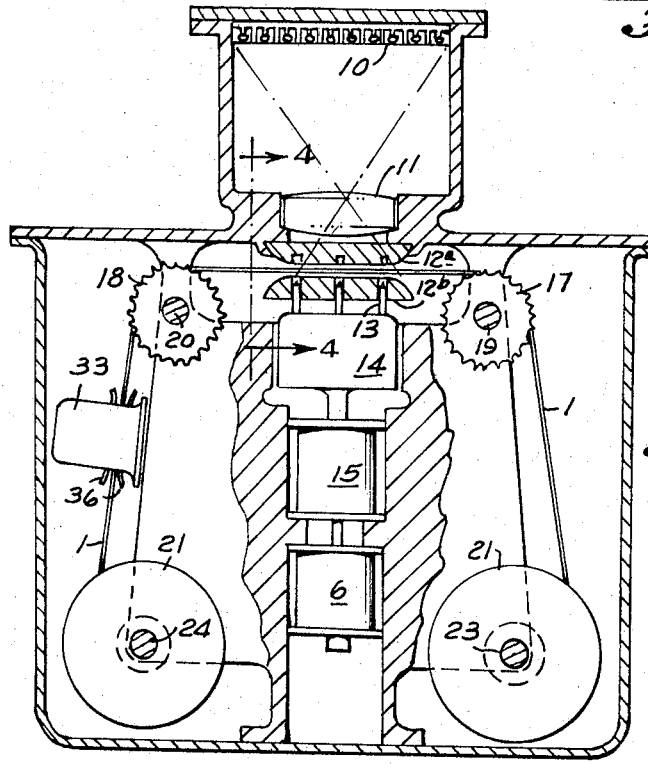
Figure 7:
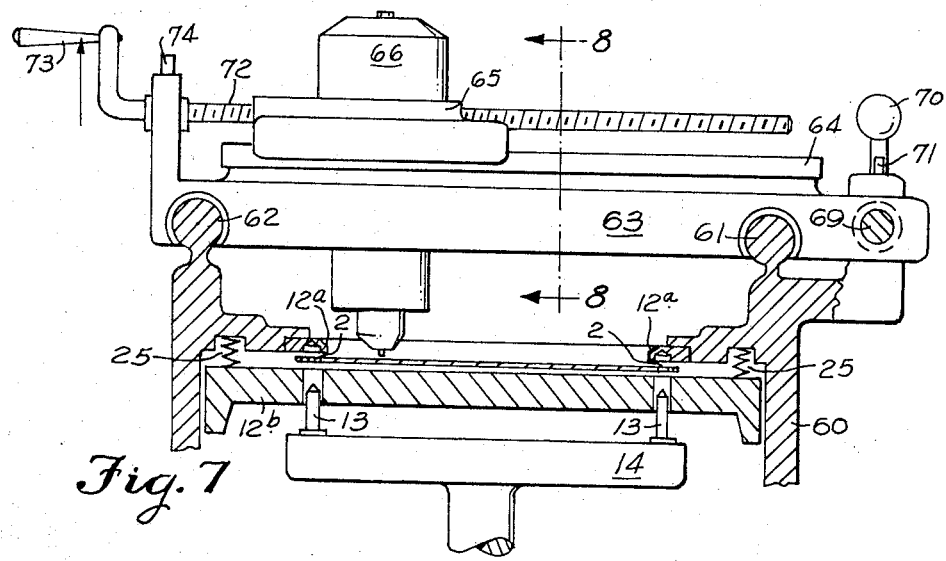
Figure 8:
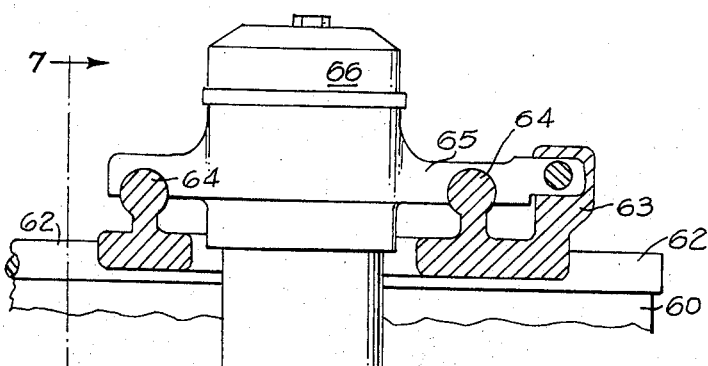
Figure 9:
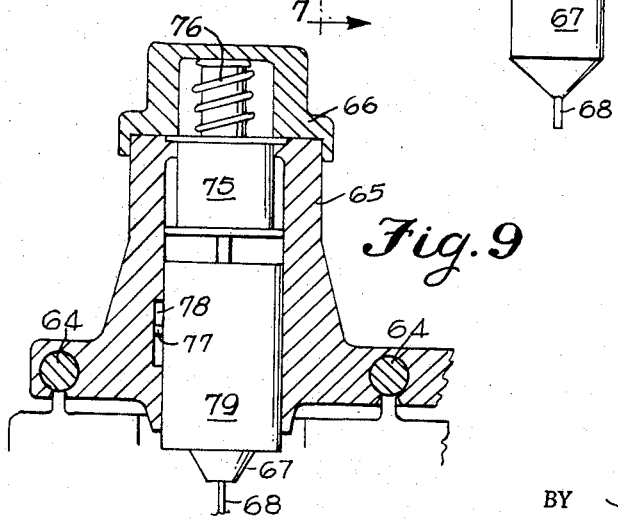

The invention will now be described in detail with the help of the following figures:

FIGURE 1 shows a sample of the tape record.
FIGURE 2 shows a sample of a sheet record.
FIGURE 3 shows a section of a device for data entry by exposure of light sensitive material.
FIGURE 4 shows a detail of FIGURE 3.
FIGURE 5 shows a code reading device for reading code on the film.
FIGURE 6 shows the block diagram of the servo-mechanism.
FIGURES 7 and 8 show a data entry mechanism by a rotating drill.
FIGURE 9 shows a view partially in section of the automatic drill.

Entry by exposures on film

In FIGURE 1, which shows an example of a tape record according to the invention, numeral 1 designates the record. Numerals 2 designate alignment holes which are used for accurate alignment of the records for data entry, as well as for readout by superimposition or photographic reproduction by contact printing. These same holes can be used to move the tape to the desired positions.

The dashed lines designated by numeral 3 are the areas dedicated to a term. Numerals 4 designate transparent spots or holes. If the coordinates 6 and 7 of hole 5 are respectively 15 and 81, then hole 5 represents information item 1581.

FIGURE 2 shows a record based on flat sheet material rather than tapes. It is also possible to use a scroll. A scroll would be comparable to the sheet material except that instead of keeping it flat, it will be stored rolled on a cylinder.

FIGURE 3 shows a view of a data entry device based on tape 1 coated with light sensitive material. There is a light matrix at the top of the machine having as many discrete lights 10 as there are dedicated positions for each term. A lens 11 focuses one or more of these lightspots 10 on a section of the tape 1, which is held in accurate alignment by the alignment pins 13 which are moved upward in the holder 12b until the top of part 14 on which the pins 13 are mounted, engages the bottom of holder 12a. Holder 12b is then pushed against 12a and the film is firmly clamped in between.

FIGURE 4 shows a different view of this arrangement, as well as return springs 25 which serve to disengage parts 12a and 12b.

The tape 1 is guided over sprocket wheels 17 and 18 mounted on shafts 19 and 20. Attached to these is a counting mechanism that registers the number of revolutions made. In this manner it is possible to determine the frame that is to be exposed. Shafts 19 and 20 are connected by means of a chain drive or comparable means of synchronization.

The film winds and unwinds from reels 23 and 24, which are servo-driven and receive feedback from the counters mounted on the shafts 19 and 20 of the sprockets 17 and 18.

Servo mechanism for tape drive

FIGURE 6 shows a block diagram of the servo mechanism which positions the tape at the desired position. Part of this servo mechanism is a device which records which frame is being engaged by the data entry device. This can be accomplished by tying a counting device to one of the sprockets 17 and 18 and counting up or down.

Instead of this, a direct readout of a code for the frame number or name is also possible. Numerals 5 in FIGURE 1 designates such a code.

FIGURE 5 shows a possible embodiment of the Code Reading device. This consists in part of light source 30, collimating lens systems 31, aperture slit 32, all maintained in alignment by housing 33. This assembly produces a beam of light which penetrates all of the binary coded area of this record 1. A row of photocells 34 is arranged behind an aperture slit 35, and all are again maintained in alignment by housing 33. Film 1 enters the reading device and is held in alignment with various parts of that device by means of guides 36. Film is driven through the reading device by drive sprocket 18. Alignment of parts of this device is such that light from the source 30 is blocked by opaque areas in the film 1 or is passed by clear dots 5 to impinge on the light sensitive area of the row of photocells 34. The photocells 34 are a type well known in the state of the art, which produce a useful electrical signal when energized by impinging light. Thus the output of the reading device with film in reading position is presence of electrical signal on certain photocells (binary number "1") and absence of electrical signal on the other photocells (binary number "0") which corresponds to the discrete term code on the film at that point.

FIGURE 6 shows a block diagram of the system. Since the term areas 3 on the records are identified by a numeral and are placed on the tape 1 in ascending sequence, a single directional servo would be the simplest embodiment. The listing of the terms in which a spot has to be exposed should also be arranged in ascending sequence in order to avoid unnecessary back and forth movement.

To enter a document, the light 10 corresponding to the document to be entered will have to be lit.

A program source 40 consists of a listing of the term numbers whose areas will have to be exposed by that light in machine language form, such as tabulating card, punched paper tape, magnetic tape or manual keyboard. This is fed into a machine language reader and translator 41 which is well known in the state of the art. It automatically reads the numerals of the program source and converts these to binary code form. This results in simultaneous electrical signals which will be transmitted on certain of lines 42, the number of lines depending on the type of binary code used. Twelve lines 42, for example, would provide for a 4096 term vocabulary.

Lines 42 enter a multiple input electrical "AND" gate 45. Photocells 34 are connected to lines 44 which also enter "AND" gate 45. Lines 42 and 44 are connected to elements of the "AND" gate so that the first digit line 42 of the reader 41 and the first digit line 44 of the photocells 34 enter the first element of the "AND" gate, etc. The electrical function is such that if the input signals in this first element of the "AND" gate match, such as both "0" or both "1," then an electrical output follows.

All elements of this "AND" gate are connected in series so that an electrical output is produced on line 46 when and only when all signals match line for line into the "AND" gate 45.

During typical operation as the film passes through the code reading device, the electrical signals on lines 44 continuously change until a match occurs between these lines and the electrical signals on lines 42. This triggers a pulse circuit 47 which simultaneously produces electrical pulses on lines 48, 49 and 50. The pulse on line 49 actuates the data entry head 51 which operates on the film 1. The pulse on line 50 actuates the program source reader which causes it to read the next ascending machine language number. The pulse on line 48 actuates a bi-stable electrical circuit 52, such as a relay, flip-flop or silicon-controlled rectifier which stops drive motor 53 through line 56. The drive motor 53, which is coupled to the drive sprocket 18, is a fast-stopping motor, such as a stepper or impulse motor. An electrical device 54, such as a switch, on the data entry head 51 senses the completion of the data entry operation and by means of an electrical signal on line 55 returns the bi-stable electrical circuit 52 to its original condition which starts motor 53 to begin the next cycle of operation.

The speed of operation of the servo loop is such that when the photocells read the proper code, the electrical signals on lines 46, 48 and 56 stop the motor 53 so that the data storage area of the film is properly located in the data entry head 51. The cycle continues in the manner described above until all terms on the program source 40 have been placed in the data entry head.

*Entry by means of drill*

Instead of utilizing light sensitive or radiation sensitive film on which data have to be entered by exposure to light or radiation, it is also possible to utilize opaque records and drill holes in the same. In that case the drill has to penetrate the record entirely and run into a form of backup plate. This procedure is undesirable for the following reasons:

If the backup plate has a number of pre-made recesses for the drill to run into, the records in which the holes are drilled will have burrs. On the other hand, if the backup plate does not have pre-made recesses, the drill will have to drill into the backup plate and remove material. This imposes an additional load on the drill.

According to the invention it is, therefore, also possible to utilize records which are substantially transparent but have a very thin opaque coating on top. Such records could, for example, be produced by taking photographic film, exposing the same and developing it. The light sensitive layer will then be opaque. Numeral 1 in FIGURES 7 and 8 designates this type of record. Transparent spots are made in this record by means of a drill bit 68 mounted in a chuck 67 driven by a drive installation 66.

The drill bit is extremely short and mounted close to record 1. To enter data it will have to be lowered only a very short distance, enough for the drill bit to drill a hole in the opaque coating of record 1.

FIGURES 7 and 8 show two views partially in section of the arrangements of the drill 66 and record 1 and the manner in which the two cooperate. Record 1 is driven in the same manner as in the embodiments of FIGURES 3, 4, 5 and 6. When the record is stopped at the desired position, member 14 is moved upward whereby alignment pins 13 penetrate alignment holes 2 in record 1 and recesses 12a into the frame of the machine. In doing this, member 14 will also engage holder 12b and impress the same against the ercord 1. In this position record 1 is held tightly and accurately and drill mechanism 66 can lower the rotating chuck 67 and drill bit 68 to engage record 1. The drill is then retracted and record 1 is moved to another position where the drill operation is repeated.

The drill assembly comprises a carriage 63 slidably mounted on two rails 61 and 62. Mounted on cross carriage 63 is drill carriage 65 slidably mounted on two rails 64. Usually cross carriage 63 and drill carriage 65 will be movable in perpendicular directions. However, this is not necessarily always the case. Drill carriage 63 is moved by a helical screw 69 driven by a crank 70. A detent 71 can lock helical screw 69 in a number of positions so that drill carriage 63 can be positioned corresponding to the 100 positions along the X axis in which the drill 66 may have to make perforations.

Drill carriage 65 can be moved by means of a helical screw 72 driven by a crank 73. A detent 74 can lock helical screw 72 in any of a number of positions in such a manner that drill mechanism 66 can be locked in any of the positions along the Y axis in which it may have to drill perforations in record 1. Instead of driving helical screws 70 and 72 by means of cranks, they can also be driven by electric motors or servo mechanisms, etc. Thus it is possible to program the data entry for entire automatic operation by programming the servos that move record 1 and the servos that move drill mechanism 66 from the same program source.

The entire mechanism to move in position drill mechanism 66 must be extremely accurate. If 35 mm. film is used for record 1, this mechanism will have to be based on techniques and tolerances used in the jewelry industry and in use with jewelers' tools.

In FIGURE 9 the drill motor 79, driving chuck 67 and drill bit 68, could be a small electric motor. Since the travel is small, it can be lowered by a solenoid 75 working against the pressure of a compression spring 76. Pin 77 sliding in slot 78 prevents rotation of the drill motor.

The invention is not limited to the embodiment described above, but comprises all possible embodiments within the scope of the claims.

I claim:

1. Apparatus for entering coded data in the form of radiation-permeable spots at matrix positions in selected ones of a plurality of matrix areas spaced in at least one direction along a lengthy record strip, each matrix area being associated with a coded representation of radiation-permeable spots on said strip, comprising:
    (a) power means for feeding such a record strip in a direction parallel to one major coordinate direction common to all of said matrix areas,
    (b) coded sensing means adjacent the means of travel of said record strip, for sensing successive matrix-position identification codes presented thereto during the motion of said strip,
    (c) spot recording means adjacent the path of said strip for controllably registering coded data on said strip in the form of radiation-permeable spots,
    (d) a program source for generating successive code signals identifying matrix positions on said strip in which new information is to be recorded,
    (e) comparison gate means under the joint control of said program source and said code sensing means for controlling the energization of said power means to arrest the motion of said strip when a desired matrix area is positioned in alignment with said spot recording means, and
    (f) means controlled by said program source for actuating said spot recording means upon the occurrence of an output signal from said comparison gate means.

2. Apparatus in accordance with claim 1, in which said spot recording means comprises drilling means.

3. Apparatus in accordance with claim 1, in which the record strip has an over-all opaque coating, and in which said spot registering means comprises means for selectively locally removing said coating.

4. Apparatus in accordance with claim 1, in which said program source includes a coded tape reader.

5. Apparatus in accordance with claim 1, in which said spot recording means includes an array of spot-producing light sources.

References Cited
UNITED STATES PATENTS

| | | | |
|---|---|---|---|
| 2,390,439 | 12/1945 | Johnson | 88—24 X |
| 2,820,907 | 1/1958 | Silverman | 88—24 X |
| 3,052,150 | 9/1962 | Jonker | 88—1 |
| 3,117,491 | 1/1964 | Stern | 88—24 |
| 3,179,001 | 4/1965 | Silverman | 88—24 |

NORTON ANSHER, *Primary Examiner.*

R. A. WINTERCORN, *Assistant Examiner.*